US008305397B2

(12) United States Patent  (10) Patent No.: US 8,305,397 B2
Ueno et al.  (45) Date of Patent: Nov. 6, 2012

(54) EDGE ADJUSTMENT METHOD, IMAGE PROCESSING DEVICE AND DISPLAY APPARATUS

(75) Inventors: Koichi Ueno, Hakusan (JP); Masanori Katsura, Hakusan (JP); Kazuyuki Watanabe, Hakusan (JP); Yasuhiro Kobayashi, Hakusan (JP); Kiyoyuki Tanaka, Hakusan (JP)

(73) Assignee: Eizo Nanao Corporation, Hakusan (JP)

( * ) Notice: Subject to any disclaimer, the term of this patent is extended or adjusted under 35 U.S.C. 154(b) by 734 days.

(21) Appl. No.: 12/311,641
(22) PCT Filed: Aug. 1, 2007
(86) PCT No.: PCT/JP2007/365055
§ 371 (c)(1),
(2), (4) Date: Apr. 6, 2009
(87) PCT Pub. No.: WO2008/041412
PCT Pub. Date: Apr. 10, 2008

(65) Prior Publication Data
US 2010/0033497 A1    Feb. 11, 2010

(30) Foreign Application Priority Data
Oct. 4, 2006  (JP) ................................. 2006-273226

(51) Int. Cl.
*G06T 17/00* (2006.01)
*G09G 5/00* (2006.01)
*G03F 3/08* (2006.01)
*H04N 1/46* (2006.01)
*H04N 5/21* (2006.01)
*G06K 9/40* (2006.01)
*G06K 9/36* (2006.01)
*H04N 5/00* (2006.01)
*H04N 9/64* (2006.01)
*H04N 5/52* (2006.01)

(52) U.S. Cl. ........ 345/611; 345/428; 345/581; 345/586; 345/606; 358/518; 358/523; 358/525; 358/530; 382/254; 382/274; 382/266; 382/282; 348/571; 348/607; 348/627; 348/683

(58) Field of Classification Search .................. 345/428, 345/581, 586, 589–590, 606, 618–619, 643–644; 358/518–520, 525, 530, 448, 461; 382/218–220, 382/162, 167, 190, 254, 266, 274, 276, 282; 348/251–254, 222.1, 571, 606–607, 615, 348/625, 627, 683
See application file for complete search history.

(56) References Cited

U.S. PATENT DOCUMENTS
6,097,847 A    8/2000  Inoue
(Continued)

FOREIGN PATENT DOCUMENTS
JP     06-068252     3/1994
(Continued)

OTHER PUBLICATIONS
The International Preliminary Examination Report (PCT/IB/338, PCT/IB/373 & PCT/ISA/237).
(Continued)

*Primary Examiner* — Wesner Sajous
(74) *Attorney, Agent, or Firm* — David G. Conlin; Steven M. Jensen; Edwards Wildman Palmer LLP

(57) ABSTRACT

A noise removing filter removes noise from an input image and an edge component extracting unit extracts edge components. The edge components are extracted by calculating a difference between the input image and a smoothed image, which is obtained by smoothing the input image in a smoothed image generating portion. An edge component comparing unit compares the extracted edge components with a threshold value and a sum calculating unit calculates the sum of the edge components greater than the threshold value. A control circuit determines the enhancement degree of the edges based on the sum and averaged luminance of the input image calculated by an average luminance calculating unit. An enhancement degree adjustment unit adjusts the determined enhancement degree, and an edge component enhancement unit enhances the edge components based on this enhancement degree and adds it to the input image to perform edge enhancement processing.

7 Claims, 11 Drawing Sheets

U.S. PATENT DOCUMENTS

| | | | |
|---|---|---|---|
| 6,774,943 B1* | 8/2004 | Kao et al. | 348/252 |
| 6,915,023 B2* | 7/2005 | Hamada et al. | 382/266 |
| 2002/0181800 A1* | 12/2002 | Hamada et al. | 382/266 |
| 2005/0104974 A1* | 5/2005 | Watanabe et al. | 348/222.1 |
| 2006/0098122 A1* | 5/2006 | Kobayashi et al. | 348/571 |
| 2008/0050032 A1* | 2/2008 | Okuno et al. | 382/266 |
| 2010/0260436 A1* | 10/2010 | Watanabe et al. | 382/266 |

FOREIGN PATENT DOCUMENTS

| | | |
|---|---|---|
| JP | 11-187284 | 7/1999 |
| JP | 2002-083294 | 3/2002 |
| JP | 2002-190984 | 7/2002 |
| JP | 2002-247611 | 8/2002 |
| JP | 2003-198881 | 7/2003 |
| JP | 2004-343645 | 12/2004 |
| JP | 2005-176060 | 6/2005 |
| JP | 2006-165950 | 6/2006 |

OTHER PUBLICATIONS

International Search Report (mailed Oct. 16, 2007).

Japanese Office Action (with English translation) dated Aug. 16, 2007.

Extended European Search Report issued for corresponding European Patent Application No. 07791739.1 (Oct. 31, 2011).

Nowak, R. D. et al., "Optimally Weighted Highpass Filters Using Multiscale Analysis," Image Analysis and Interpretation 1996, Proceedings of the IEEE Southwest Symposium, San Antonio, Texas, Apr. 8-9, 1996, pp. 224-229.

* cited by examiner

F I G. 5

(a)

| | SUM >  THRESHOLD VALUE TB | SUM ≦ THRESHOLD VALUE TB |
|---|---|---|
| AVERAGE LUMINANCE < THRESHOLD VALUE TA | ENHANCEMENT DEGREE : α | ENHANCEMENT DEGREE : α |
| AVERAGE LUMINANCE ≧ THRESHOLD VALUE TA | ENHANCEMENT DEGREE : α | ENHANCEMENT DEGREE : α´ |

(b)

| EDGE COMPONENT | ENHANCEMENT DEGREE : α | ENHANCEMENT DEGREE : α´ |
|---|---|---|
| 0~15 | $α_1$ | $α´_1$ |
| 16~31 | $α_2$ | $α´_2$ |
| 32~47 | $α_3$ | $α´_3$ |
| ... | ... | ... |
| 240~255 | $α_{16}$ | $α´_4$ |

(WHEREIN $α_i < α´_i$)

FIG. 9

|  | SUM > THRESHOLD VALUE TB | SUM ≦ THRESHOLD VALUE TB |
|---|---|---|
| PROPORTION<80% | ENHANCEMENT DEGREE: $\alpha$ | ENHANCEMENT DEGREE: $\alpha$ |
| PROPORTION≧80% | ENHANCEMENT DEGREE: $\alpha$ | ENHANCEMENT DEGREE: $\alpha'$ |

EDGE ADJUSTMENT METHOD, IMAGE PROCESSING DEVICE AND DISPLAY APPARATUS

This application is the national phase under 35 U.S.C. §371 of PCT International Application No. PCT/JP2007/65055 which has an International filing date of Aug. 1, 2007 and designated the United States of America.

BACKGROUND

1. Technical Field

The present invention relates to an edge adjustment method for performing adjustment such as edge enhancement suited to the characteristics of the input image, an image processing device for performing edge adjustment on the input image by using such method, and a display apparatus, mounted with the image processing device, for displaying the image performed with the edge adjustment.

2. Description of Related Art

Conventionally, a liquid crystal display device for displaying images with a liquid crystal panel is being widespread used as one of the display devices. The liquid crystal display device has an advantage over the display device with a cathode ray tube in that a large and thin display device can be realized. A high-quality image with large amount of data now can be displayed on the display device with increase in the communication speed of the wired or wireless data communication and larger capacity of the recording medium such as DVD or hard disc. In particular, high-definition broadcast is being given attention in recent years, and a high resolution display device capable of displaying an HD (High Definition) image transmitted from a broadcast station by high-definition broadcast is being desired.

However, the current television broadcasts are not all carried out in high-definition broadcast, and a standard broadcast for transmitting the image of lower quality than the HD image, or a so-called SD (Standard Definition) image, and the high-definition broadcast coexist. If the display device corresponding to the display of the HD image displays the SD image, an image with a blurred edge may be displayed, which becomes more significant the larger the display device. In order to transmit the image generated as an SD image in the high-definition broadcast, the SD image is converted to the HD image (so-called, up covert), and then the converted image (hereinafter referred to as up converted image) may be transmitted. The up converted image has a high possibility of being an image with a blurred edge compared to the HD image depending on the image quality of the original SD image, the performance of up conversion, and the like.

Thus, the display device has a function of performing image adjustment process of enhancing the edge of the image before displaying the received image, and displaying the adjusted image, so that the image with the blurred edge is prevented from being displayed. Furthermore, not limited to the television broadcast, and even when displaying the image recorded on a recording medium such as the DVD, the edges are similarly adjusted so that the image with the blurred edge is prevented from being displayed.

Japanese Patent Application Laid-Open No. 2005-176060 proposes a signal processing device capable of performing a high-precision edge adjustment adapted to the frequency band at an appropriate timing when an image of different standard such as SD signal and HD signal is input. In such signal processing device, a data string of a luminance difference of a pixel pair adjacent to each other or with a few pixels in between is first generated for every predetermined number of frames of a luminance signal, a maximum luminance difference is detected from the data string and held, and the data string of the luminance difference is converted to the amount of edge adjustment based on the maximum luminance difference. Then, an edge adjusted signal is generated according to the amount of edge adjustment, and the input image signal and the edge adjusted signal are added by synchronization to thereby adjust the edge of the input image.

SUMMARY

However, when the display device displays the image with the enhanced edge, an optimum enhancement degree differs depending on the characteristics of the original image. For instance, when the enhancement degree is set such that enhancement of the edge suited to the up converted image can be carried out, the edge of the image may be enhanced in excess and the quality of the displayed image may degrade if the edge of the HD image is enhanced in such setting. When the enhancement degree is set such that enhancement of the edge suited to the HD image can be carried out, the edge of the image may not be sufficiently enhanced if the edge of the up converted image is enhanced in such setting. Thus, the edge is desirably adjusted at the enhancement degree corresponding to the characteristics of the image in the display device.

The signal processing device described in Japanese Patent Application Laid-Open No. 2005-176060 is configured to acquire the maximum luminance difference from the input image, estimate the acquired maximum luminance difference as the maximum frequency of the luminance of the input image, and adjust the enhancement degree of the edge based thereon, so that the edges of the images of different standards such as the SD signal and the HD signal can be enhanced according to the respective characteristics. However, the maximum luminance difference acquired from the input image may not necessarily be equal to the maximum frequency of the luminance of the input image, and thus the enhancement degree of the edge may not be set at the optimum value depending on the content of the input image (e.g., object, scenery, and the like in the image), the condition when the input image is imaged (e.g., exposure time, brightness, or etc.), and the like.

In view of the above situations, it is an object of the present invention to provide an edge adjustment method capable of performing edge enhancement suited to the characteristics of the input image by extracting the edge components of the input image, calculating the sum of the extracted edge components, and determining the enhancement degree of the edge based on the sum of the edge components to adjust the edge; and an image processing device for adjusting the edge of the input image by such method.

Another object of the present invention is to provide an edge adjustment method capable of performing edge enhancement more suited to the characteristics of the input image by being configured to calculate an average of the luminance components of the input image, and determine the enhancement degree of the edge based on the sum of the edge components and the average of the luminance components; and an image processing device for adjusting the edge of the input image by such method.

Another further object of the present invention is to provide an edge adjustment method capable of performing edge enhancement more suited to the characteristics of the input image by being configured to calculate a proportion of a region in the input image having luminance components greater than a predetermined luminance, and determine the enhancement degree of the edge based on such proportion and the sum of the edge components; and an image processing device for adjusting the edge of the input image by such method.

Still another object of the present invention is to provide an edge adjustment method capable of performing edge enhancement more suited to the characteristics of the input image by being configured to acquire a distribution of the luminance components of the input image, and determine the enhancement degree of the edge based on the sum of the edge components and the distribution of the luminance components; and an image processing device for adjusting the edge of the input image by such method.

Yet another object of the present invention is to provide an edge adjustment method capable of extracting the edge components with only a simple calculation by being configured to generate a smoothed image, which is obtained by smoothing the input image, calculate a difference between the input image and the smoothed image, and extract the difference as the edge components of the input image; and an image processing device for adjusting the edge of the input image by such method.

Another further object of the present invention is to provide an edge adjustment method capable of enhancing the edge with only a simple calculation by being configured to enhance the edge components extracted according to the determined enhancement degree, and add the enhanced edge components to the input image to adjust the edge; and an image processing device for adjusting the edge of the input image by such method.

Another further object of the present invention is to provide a display apparatus capable of displaying an image with a clear edge by being configured to include an input means for inputting an image to the image processing device for performing the adjustment process of enhancing the edge described above, and a display means for displaying the image with the enhanced edge.

The first invention relates to an edge adjustment method for adjusting an edge of an input image, comprising the steps of: extracting edge components of the input image; calculating a sum of the extracted edge components; determining an enhancement degree of the edge based on the calculated sum; and adjusting the edge according to the determined enhancement degree.

The second invention relates to the edge adjustment method further comprising the steps of: calculating an average of luminance components of the input image; and determining the enhancement degree of the edge based on the calculated sum of the edge components and the average of the luminance components when determining the enhancement degree of the edge.

The third invention relates to the edge adjustment method further comprising the steps of: calculating a proportion of a region in the input image having luminance components greater than a predetermined luminance; and determining the enhancement degree of the edge based on the calculated sum of the edge components and the proportion when determining the enhancement degree of the edge.

The fourth invention relates to the edge adjustment method further comprising the steps of: acquiring a distribution of luminance components of the input image; and determining the enhancement degree of the edge based on the calculated sum of the edge components and the acquired distribution of the luminance components when determining the enhancement degree of the edge.

The fifth invention relates to the edge adjustment method, wherein when extracting the edge components of the input image, a smoothed image, obtained by smoothing the input image, is generated; a difference of the input image and the smoothed image is calculated; and the calculated difference is extracted as the edge components.

The sixth invention relates to the edge adjustment method further comprising the steps of enhancing the extracted edge components according to the determined enhancement degree of the edge; and adjusting the edge by adding the enhanced edge components to the input image.

The seventh invention relates to an image processing device for performing a process of adjusting an edge of an input image, comprising: an extracting means for extracting the edge components of the input image; a sum calculating means for calculating a sum of the edge components extracted by the extracting means; a determination means for determining an enhancement degree of the edge based on the sum calculated by the sum calculating means; and an adjusting means for adjusting the edge according to the enhancement degree determined by the determination means.

The eighth invention relates to the image processing device further comprising: an average luminance calculating means for calculating an average of luminance components of the input image; wherein the determination means determines the enhancement degree of the edge based on the sum calculated by the sum calculating means and the average calculated by the average luminance calculating means.

The ninth invention relates to the image processing device further comprising: a proportion calculating means for calculating a proportion of a region in the input image having luminance components greater than a predetermined luminance; wherein the determination means determines the enhancement degree of the edge based on the sum calculated by the sum calculating means and the proportion calculated by the proportion calculating means.

The tenth invention relates to the image processing device further comprising: a distribution acquiring means for acquiring a distribution of the luminance components of the input image; wherein the determination means determines the enhancement degree of the edge based on the sum calculated by the sum calculating means and the distribution acquired by the distribution acquiring means.

The eleventh invention relates to the image processing device, wherein the extracting means includes a generating means for generating a smoothed image, obtained by smoothing the input image, and a difference calculating means for calculating a difference of the input image and the smoothed image; and the difference calculated by the difference calculating means is extracted as the edge components.

The twelfth invention relates to the image processing device, wherein the adjusting means enhances the edge components extracted by the extracting means according to the enhancement degree determined by the determination means, and adjusts the edge by adding the enhanced edge components to the input image.

The thirteenth invention relates to a display apparatus comprising: the image processing device according to any one of the image processing devices; an input means for acquiring and inputting an image to the image processing device; and a display means for displaying an image performed with the adjustment of the edge by the image processing device.

In the present invention, the edge components are extracted from an input image, and a sum of the edge components is calculated. The edge components that are extracted is in great amount in an image with a clear edge such as the HD image, whereas the edge components that are extracted is in small amount in an image with a blurred edge such as the up converted image, and thus whether or not the input image is an image with a clear edge can be judged through determination by comparing the sum of the edge components and a predetermined threshold value. The edge is enhanced with the enhancement degree determined based on the sum of the edge components, so that the enhancement of the edge is small or is not performed on the image with a clear edge and the edge is further enhanced on the image with an unclear edge to adjust the image to a clear image.

In the present invention, when calculating the average of the luminance components of the input image and determining the enhancement degree of the edge, the enhancement degree of the edge is determined based on the sum of the edge components and the average of the luminance components. For instance, in the case of an image that is entirely of the same color tone such as an entirely dark image, the sum of the edge components becomes small, and thus error may occur if judgment is made on whether or not the input image is an image with a clear edge only from the sum of the edge components. Therefore, judgment can be made on the entirely dark image and the like by calculating the average of the luminance components, whereby whether or not the input image is an image with a clear edge can be more reliably judged.

In the present invention, when calculating the proportion of the region having luminance components larger than a predetermined luminance in the input image, and determining the enhancement degree of the edge, the enhancement degree of the edge is determined based on the proportion and the sum of the edge components. Since whether or not the input image is an entirely dark image can be judged by calculating the proportion of the region having luminance components larger than a predetermined luminance, whether or not the input image is an image with a clear edge can be more reliably judged.

In the present invention, when acquiring the distribution of the luminance components of the input image and determining the enhancement degree of the edge, the enhancement degree of the edge is determined based on the sum of the edge components and the distribution of the luminance components. Since whether or not the input image is an entirely dark image can be judged by acquiring the distribution of the luminance components, whether or not the input image is an image with a clear edge can be more reliably judged.

In the present invention, when extracting the edge components of the input image, a smoothed image obtained by smoothing the input image is first generated, the difference between the input image and the smoothed image is calculated, and such difference is extracted as the edge components of the input image. The smoothed image can be obtained by calculating the average of the pixel of interest and the pixels adjacent thereto in the image. The edge components are the difference between the input image and the smoothed image, and thus simple addition, division, and subtraction merely needs to be carried out to extract the edge components.

In the present invention, the edge components are enhanced according to the determined enhancement degree, and the edge is adjusted by adding the enhanced edge components to the input image. This is an edge enhancement by a so-called unsharpness mask, and the edge can be adjusted only with a simple multiplication and addition.

In the present invention, the image of a television program is acquired by a tuner, or an image is acquired from an external device such as a DVD player or a hard disc recorder, the acquired image is input to the image processing device as an input image, and the image performed with edge adjustment in the image processing device is displayed on a display means such as a liquid crystal panel. The edge then can be adjusted according to the characteristics of the acquired image, and an image with a clear edge can be displayed on the display means.

In the case of the first invention and the seventh invention, the edge components are extracted from the input image, the sum of the extracted edge components is calculated, and the enhancement degree of the edge is determined based on the sum of the edge components to adjust the edge, so that whether or not the input image is an image with a clear edge can be judged, and the edge enhancement suited to the characteristics of the input image can be carried out since the enhancement of the edge is small or is not performed for the image with a clear edge and the edge is further enhanced for the image with an unclear edge to adjust to a clear image. Therefore, a high-quality image can be displayed on a large liquid crystal display apparatus and the like by adjusting the edge through the edge adjustment method or by mounting the image processing device for performing the edge enhancement through the edge adjustment method.

In the case of the second invention and the eighth invention, the average of the luminance components of the input image is calculated, and the enhancement degree of the edge is determined based on the sum of the edge components and the average of the luminance components, so that an entirely dark image and the like can be judged and whether or not the input image is an image with a clear edge can be reliably judged, whereby the enhancement of the edge more suited to the characteristics of the input image can be carried out. Therefore, a higher quality image can be displayed on the large liquid crystal display apparatus and the like.

In the case of the third invention and the ninth invention, the proportion of the region having luminance components greater than a predetermined luminance in the input image is calculated, and the enhancement degree of the edge is determined based on the proportion and the sum of the edge components, so that an entirely dark image and the like can be judged and whether or not the input image is an image with a clear edge can be reliably judged, whereby the enhancement of the edge more suited to the characteristics of the input image can be carried out. Therefore, a higher quality image can be displayed on the large liquid crystal display apparatus and the like.

In the case of the fourth invention and the tenth invention, the distribution of the luminance components of the input image is acquired and the enhancement degree of the edge is determined based on the sum of the edge components and the distribution of the luminance components, so that an entirely dark image and the like can be judged and whether or not the input image is an image with a clear edge can be reliably judged, whereby the enhancement of the edge more suited to the characteristics of the input image can be carried out. Therefore, a higher quality image can be displayed on the large liquid crystal display apparatus and the like.

In the case of the fifth invention and the eleventh invention, when extracting the edge components of the input image, a smoothed image obtained by smoothing the input image is first generated, the difference between the input image and the smoothed image is calculated, and such difference is extracted as the edge components of the input image, so that the edge components can be extracted only through a simple calculation of addition, division, and subtraction. Therefore, increase in cost of the image processing device due to addition of the function of adjusting the edge through such method can be suppressed, and the display apparatus mounted with the image processing device can be provided at low cost.

In the case of the sixth invention and the twelfth invention, the edge components are enhanced according to the determined enhancement degree, and the edge is adjusted by adding the enhanced edge components to the input image, so that the edge can be adjusted through a simple configuration of multiplication and addition, whereby increase in cost of the image processing device due to addition of the function of adjusting the edge through such method can be suppressed, and the display apparatus mounted with the image processing device can be provided at low cost.

In the case of the thirteenth invention, the image is acquired from a tuner or an external device and inputted to the image processing device, and the image performed with edge adjustment in the image processing device is displayed on the display means such as a liquid crystal panel, so that the edge can be adjusted according to the characteristics of the acquired image, and an image in which the edge is clear and not blurred can be displayed, thereby improving the display quality of the display apparatus.

The above and further objects and features will more fully be apparent from the following detailed description with accompanying drawings.

BRIEF DESCRIPTION OF THE SEVERAL VIEWS OF THE DRAWINGS

FIGS. 5(a) to 5(b) are schematic views describing the method for determining the enhancement degree of the edge components.

FIG. 9 is a schematic view describing the method for determining the enhancement degree of the edge components in the second embodiment.

DETAILED DESCRIPTION

First Embodiment

Figure 1:
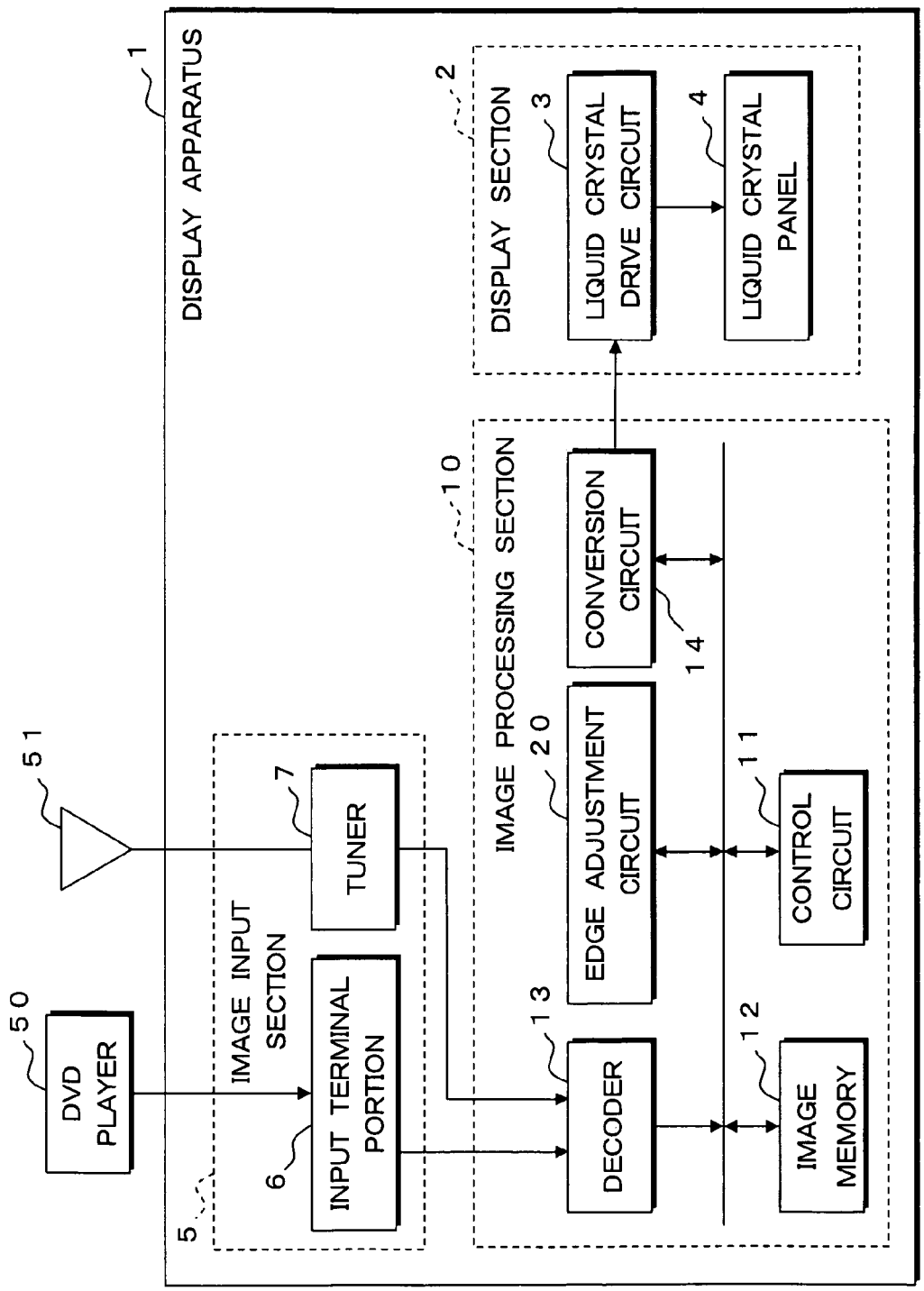
FIG. 1 is a block diagram showing a configuration of a display apparatus according to the present invention.

The present invention will be specifically described based on the drawings showing the embodiments thereof FIG. 1 is a block diagram showing a configuration of a display apparatus according to the present invention. Number 1 in the figure denotes a display apparatus for displaying images provided from a DVD player 50, images related to television broadcast received at an antenna 51, and the like on a liquid crystal panel 4. The display apparatus 1 includes a display section 2 for displaying images by means of the liquid crystal panel 4, an image processing section 10 for providing a signal related to the image to display to the display section 2, and an image input section 5 for inputting images provided from the DVD player 50, images received at the antenna 51, and the like to the image processing section 10.

The image input section 5 includes an input terminal portion 6 provided with a plurality of terminals such as HDMI (High Definition Multimedia Interface) and DVI-I (Digital Visual Interface-Integrated) to acquire images from an external device such as the DVD player 50 or a hard disc recorder, and input to the image processing section 10. The image input section 5 also includes a tuner 7 connected to the antenna 51. The tuner 7 receives television broadcast such as digital terrestrial broadcast, and inputs images related to the received television broadcast to the image processing section 10.

The image input from the image input section 5 to the image processing section 10 is compressed through a compression technology such as MPEG. The image processing section 10 includes a decoder 13 for expanding the compressed image, wherein the input image from the input terminal portion 6 or the tuner 7 of the image input section 5 is first provided to the decoder 13. The image processing section 10 includes, in addition to the decoder 13, an edge adjustment circuit 20, a conversion circuit 14, an image memory 12, and a control circuit 11 for controlling them, which circuits are connected by a bus so that information can be mutually transferred. The image processing section 10 is a hardware for performing various image processing on the input image by means of such circuits, and outputting the processed image.

The edge adjustment circuit 20 is a circuit that mainly performs an adjustment process of enhancing the edge with respect to the input image input from the image input section 5 and expanded in the decoder 13, the details of which circuit will be hereinafter described. The edge of the input image may also be smoothed. The conversion circuit 14 is a circuit for converting the image subjected to various image processing to a signal for displaying on the liquid crystal panel 4 of the display section 2, and the converted signal is provided to the display section 2. The image memory 12 is a memory for storing images of the processing processes, the processing results, or the like of the expansion process of the image by the decoder 13, the adjustment process by the edge adjustment circuit 20 and the like, and is a large volume memory element such as SRAM or DRAM. The control circuit 11 is CPU, MPU, or the like, and controls the operation of each circuit in the image processing section 10 and also performs various calculations.

The image provided from the image input section 5 is expanded in the decoder 13, and the decoder 13 stores the expanded image in the image memory 12. The edge adjustment circuit 20 reads out the expanded image from the image memory 12, performs the edge adjustment process, and stores the processed image in the image memory 12. The conversion circuit 14 reads out the adjustment processed image from the image memory 12, converts it to the signal for display, and provides the signal to the display section 2. In this case, the control circuit 11 controls the operation of each circuit and the transfer of image from each circuit to the image memory 12.

The display section 2 includes the liquid crystal panel 4 for displaying images, and a liquid crystal drive circuit 3 for driving the liquid crystal panel 4 based on the signal provided from the image processing section 10. The liquid crystal panel 4 is a light transmissive display device that utilizes birefringence of the liquid crystal layer having a thickness of a few μm controllable by an external electric field. The liquid crystal panel 4 displays images by light irradiated from a backlight (not shown) since the liquid crystal panel 4 itself does not have a light emitting function. The liquid crystal drive circuit 3 drives the liquid crystal panel 4 by selectively supplying voltage to a drive wiring arranged in a matrix form in the horizontal direction and the vertical direction of the liquid crystal panel 4 in response to the signal provided from the image processing section 10, and displays images on the liquid crystal panel 4.

Figure 2:
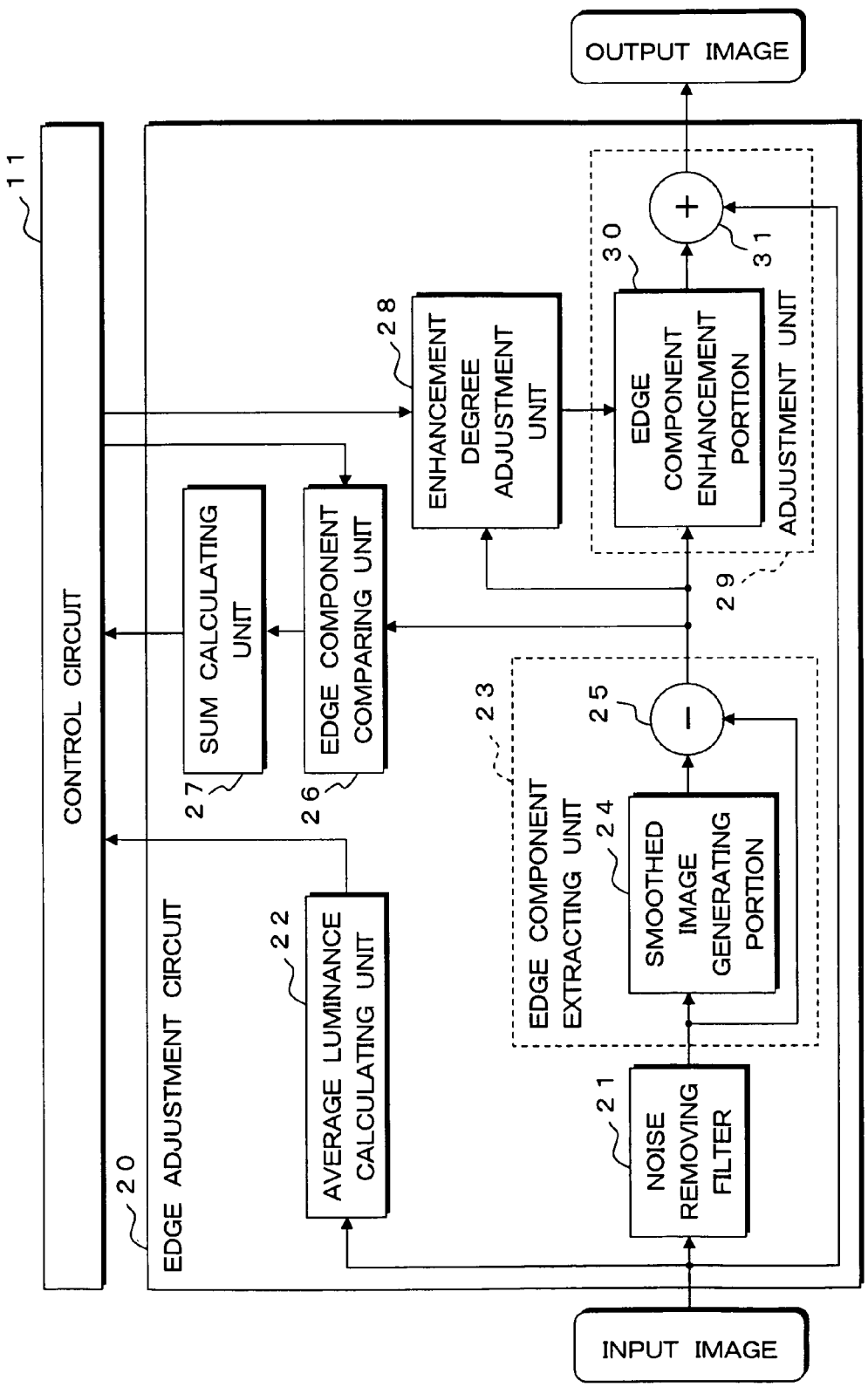
FIG. 2 is a block diagram showing a configuration of an edge adjustment circuit of the display apparatus according to the present invention.

FIG. 2 is a block diagram showing a configuration of the edge adjustment circuit 20 of the display apparatus 1 according to the present invention. In FIG. 2, the image input from the image input section 5 and expanded in the decoder 13 is illustrated as "input image", and the image performed with the edge adjustment process is illustrated as "output image".

The input image is configured by a plurality of pixels lined in a matrix form, and the edge adjustment circuit 20 includes an average luminance calculating unit 22 for acquiring a luminance value of each pixel of the input image and calculating an average luminance for every input image. The average luminance calculating unit 22 acquires and adds in order the luminance value of each pixel of the input image, calculates the total luminance by adding the luminance values of all pixels, and then calculates the average luminance by dividing the total luminance by the total number of pixels. The average luminance calculating unit 22 provides the calculated average luminance to the control circuit 11 for every calculation of the average luminance.

The edge adjustment circuit 20 also includes a noise removing filter 21 for removing low-tone noise from the input image. The noise removing filter 21, for example, removes the low-tone noise by subtracting a predetermined value from the pixel value of each pixel of the input image. The predetermined value to subtract in this case may be a predefined fixed value, or may be determined by the control circuit 11 according to the characteristics of the input image.

The edge adjustment circuit 20 further includes an edge component extracting unit 23 for extracting the edge components from the input image, from which the low-tone noise is removed in the noise removing filter 21. The edge component extracting unit 23 includes a smoothed image generating portion 24 for smoothing the edge of the input image removed with noise and generating a smoothed image, and a subtractor 25 for calculating the difference of the smoothed image and the input image removed with noise, and the calculated difference is output as the extracted contour component.

Figure 3:
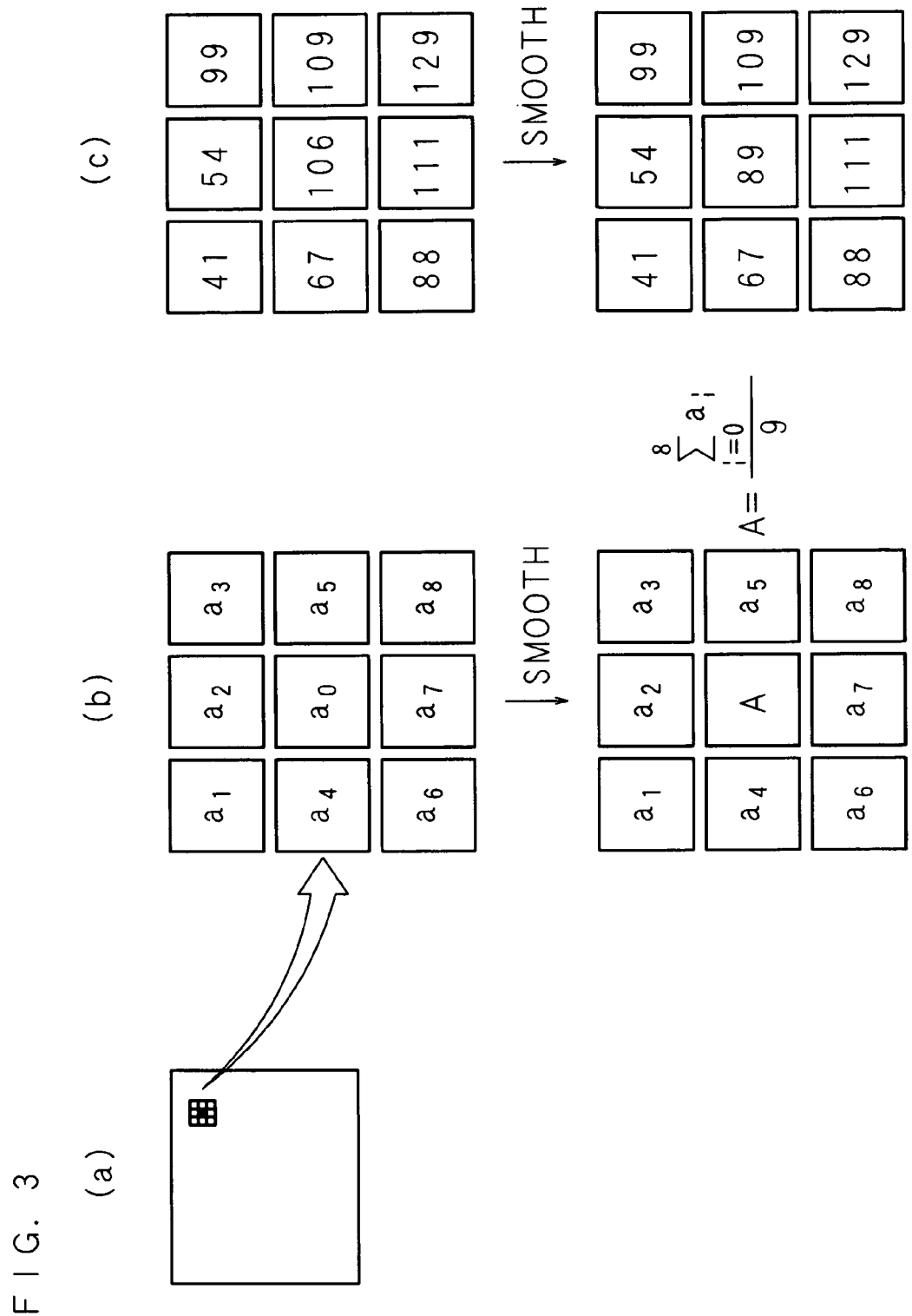
FIGS. 3(a) to 3(c) are schematic views describing a method for generating a smoothed image performed by a smoothed image generating portion.

FIGS. 3(a) to 3(c) are schematic views describing a method for generating the smoothed image performed by the smoothed image generating portion 24. Here, (a) shows the entire image input to the smoothed image generating portion 24, and (b) shows part (nine pixels) of the image of (a) in an enlarged manner. In (c), the pixel value is applied to each pixel of (b) by way of one example. The image input to the smoothed image generating portion 24 includes a plurality of pixels lined in a matrix form, and the smoothed image generating portion 24 performs a calculation for smoothing for every pixel. For instance, assuming the pixel value of the pixel of interest to be calculated for smoothing is $a_0$, and the pixel values of the eight pixels at the periphery of the pixel of interest are $a_1$ to $a_8$, the pixel value A after smoothing of the pixel of interest can be calculated with the following equation (1).

$$A = (a_0 + a_1 + \ldots + a_8)/9 \quad (1)$$

In the example shown in FIG. 3(c), the pixel value of the pixel of interest of the input image is $a_0 = 106$, but the pixel value is $A \approx 89$ due to the smoothing using equation (1). The smoothed image generating portion 24 repeatedly performs the calculation of equation (1) for all the pixels of the input image, and generates the smoothed image.

Figure 4:
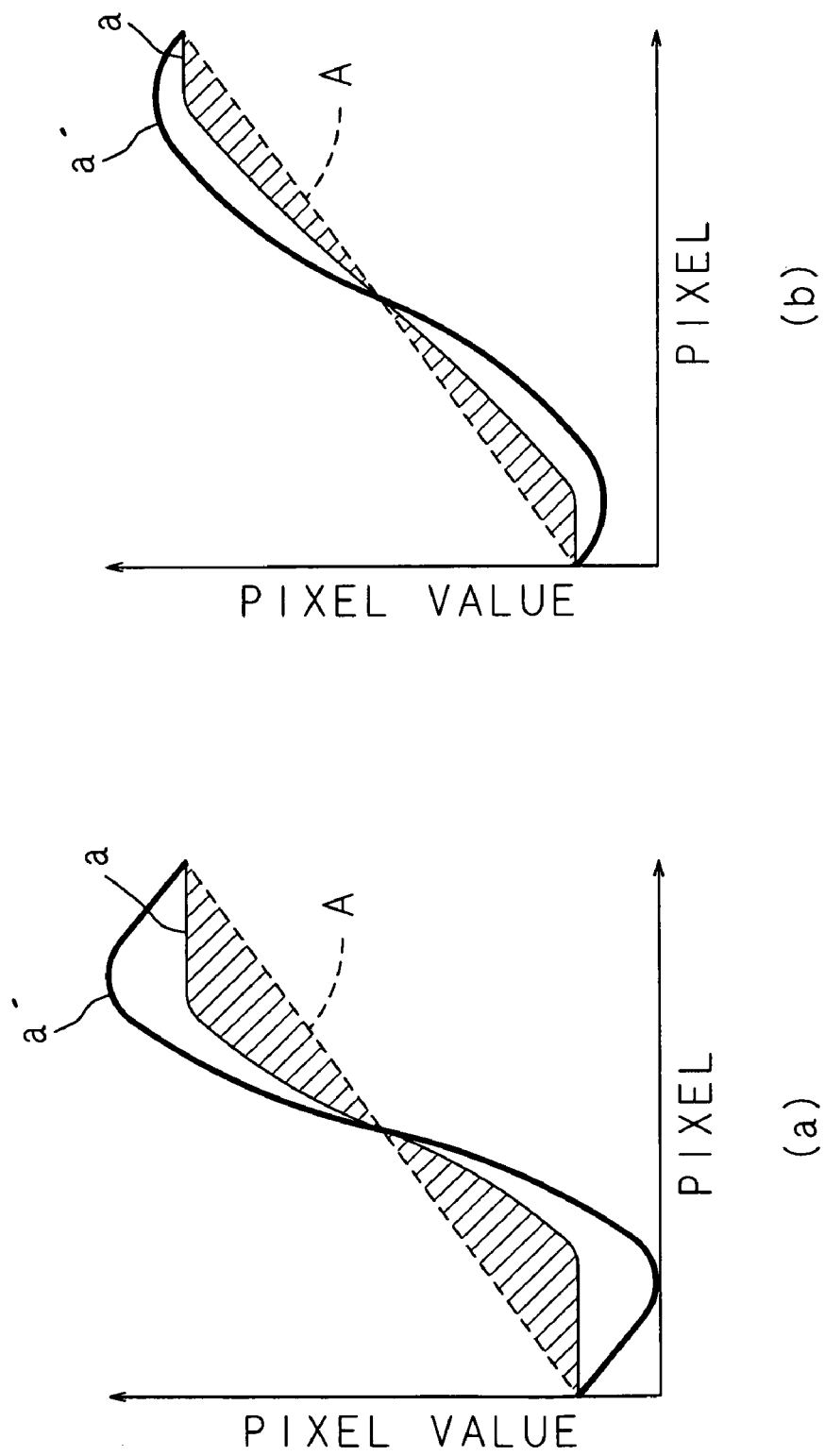
FIGS. 4(a) to 4(b) are schematic views describing a method for extracting edge components performed by an edge component extracting unit.

FIGS. 4(a) to 4(b) are schematic views describing a method for extracting the edge components performed by the edge component extracting unit 23, wherein (a) shows a case of an image with a clear edge, and (b) shows a case of an image with an unclear edge. The illustrated graphs show the arrangement of pixels in the horizontal direction or the vertical direction of the image on the horizontal axis, and the pixel value of each pixel on the vertical axis with respect to the vicinity of the edge portion in the image. A thin solid line a in the figure shows the input image provided to the edge component extracting unit 23, a broken line A shows the smoothed image smoothed by the smoothed image generating portion 24, and a thick solid line a' shows an image with enhanced edge.

In the case of the image with a clear edge (see FIG. 4(a)), the pixel value rapidly changes near the edge in the input image as shown with the thin solid line a. A smoothed image in which the change of the pixel value is gradual, as shown with the broken line A, is obtained by smoothing such input image in the smoothed image generating portion 24. When the difference between the smoothed image and the input image is calculated by the subtractor 25, the calculated difference corresponds to a region (hatched region) surrounded by the thin solid line a and the broken line A in the figure. The edge component extracting unit 23 outputs the calculated difference as the edge components, and adds the edge components to the input image (thin sold line a) to obtain an image with enhanced edge, as shown with the thick solid line α' in the figure.

In the case of the image with an unclear edge (see FIG. 4(b)), on the other hand, the change of the pixel value is gradual near the edge of the input image, as shown with the thin solid line a, and the difference with the smoothed image (broken line A) smoothed in the smoothed image generating portion 24, that is, the amount of edge components (hatched region) is small. Thus, the edge enhancement amount of the input image is small even if the edge components are added to the input image similar to the case of FIG. 4(a). Therefore, in the edge adjustment circuit 20 of the display apparatus 1 according to the present invention, the enhancement of the edge corresponding to the characteristics of the input image is performed by appropriately amplifying the edge components extracted by the edge component extracting unit 23 and adding the same to the input image.

The edge adjustment circuit 20 includes an edge component comparing unit 26 for comparing the edge components of the input image extracted by the edge component extracting unit 23 with a predetermined threshold value, and a sum calculating unit 27 for calculating the sum of the edge components greater than the threshold value. The edge component comparing unit 26 obtains the threshold value for comparison from the control circuit 11, sequentially compares the edge components extracted for every pixel of the input image by the edge component extracting unit 23 and the threshold value. Since the edge components take both positive and negative values, the absolute value of the edge components and the threshold value are compared in the edge component comparing unit 26. As a result of the comparison between each edge components and the threshold value, the edge component comparing unit 26 outputs "0" to the sum calculating unit 27 if the edge components are smaller than the threshold value, and outputs the absolute value of the edge components to the sum calculating unit 27 if the edge components are larger than the threshold value.

The sum calculating unit 27 sequentially adds the output values output by the edge component comparing unit 26, adds the edge components for all pixels of one input image, and then provides the sum, which is the addition result, to the control circuit 11. The edge components extracted by the edge component extracting unit 23 are all added in the sum calculating unit 27 if the control circuit 11 sets "0" for the threshold value of the edge component comparing unit 26. Since the edge components of small value have a possibility of being a noise, the edge component comparing unit 26 aims to remove the same from the sum calculated by the sum calculating unit 27.

The edge adjustment circuit 20 also includes an adjustment unit 29 for performing an adjustment to enhance the edge of the input image based on the edge components extracted by the edge component extracting unit 23. The adjustment unit 29 includes an edge component enhancement portion 30 for outputting the edge components provided from the edge component extracting unit 23 while enhancing the same according to a predetermined enhancement degree, and an adder 31 for adding the enhanced edge components to the input image. The edge component enhancement portion 30 calculates and outputs α×r, α being the enhancement degree and r being the edge components, wherein the enhancement degree α is a value obtained by adjusting the enhancement degree determined in the control circuit 11 in an enhancement degree adjustment unit 28. The enhancement degree adjustment unit 28 adjusts the enhancement degree provided from the control circuit 11 according to the edge components extracted by the edge component extracting unit 23, and provides the same to the edge component enhancement portion 30.

FIGS. 5(a) to 5(b) are schematic views describing the method for determining the enhancement degree of the edge components. The control circuit 11 determines the enhancement degree based on the average luminance of the input image calculated by the average luminance calculating unit 22 and the sum of the edge components of the input image calculated by the sum calculating unit 27, and provides the result to the enhancement degree adjustment unit 28. In this case, the control circuit 11 compares the average luminance of the input image and a predefined threshold value TA and also compares the sum of the edge components of the input image and a predefined threshold value TB, and determines the enhancement degree as a large value α' if the average luminance is greater than or equal to the threshold value TA and the sum of the edge components is smaller than or equal to the threshold value TB and determines as a small value α in other cases (see FIG. 5(a)). The control circuit 11 provides the determined enhancement degree α or α' (wherein, α<α') to the enhancement degree adjustment unit 28.

The enhancement degree adjustment unit 28 stores a table shown in FIG. 5(b), and adjusts the value of the enhancement degree α or α' provided from the control circuit 11 based on such table according to the value of the edge components on which enhancement is performed by the edge component enhancement portion 30. The table shown in FIG. 5(b) shows an example where the enhancement degree of the edge components is set divided into 16 stages, wherein the absolute value of the edge components has a possibility of taking a value between 0 and 255, by way of one example (wherein, $α_i<α'_i$). For instance, if the value of the edge component is "30" and the enhancement degree α is provided from the control circuit 11, the enhancement degree adjustment unit 28 adjusts the enhancement degree to "$α_2$" and provides the same to the edge component enhancement portion 30 of the adjustment unit 29. In the edge component enhancement portion 30, the product "30×$α_2$" of the edge component "30" and the enhancement degree "$α_2$" is calculated and output. If the value of the edge component is "40", and the enhancement degree α' is provided from the control circuit 11, the enhancement degree adjustment unit 28 determines the enhancement degree to "$α'_3$" and provides the same to the edge component enhancement portion 30. In the edge component enhancement portion 30, the product "40×$α'_3$" of the edge component "40" and the enhancement degree "$α'_3$" is calculated and output.

The adjustment unit 29 performs the adjustment of enhancing the edge of the input image by adding the edge components enhanced in the edge component enhancement portion 30 and the input image in the adder 31, and outputs the result of addition in the adder 31 as the output image. FIGS. 6(a) to 6(b) are schematic views showing one example of an adjustment of enhancing the edge performed by the adjustment unit 29, wherein (a) shows a case of an image with a clear edge and (b) shows a case of an image with an unclear edge. The illustrated graph shows the arrangement of pixels in the horizontal direction or the vertical direction of the image on the horizontal axis, and shows the pixel value of each pixel on the vertical axis respect to the vicinity of the edge components in the image. The thin solid line a in the graph shows the input image, the broken line A shows the smoothed image smoothed by the smoothed image generating portion 24, and the thick solid line a' shows the image which edge is enhanced in the adjustment unit 29.

In the case of the image with the clear edge, that is, the image in which the sum of the edge components (hatched region in the figure) is large (see FIG. 6(a)), the enhancement degree of the edge components is set small and it is added to the input image. In the case of the image with the unclear edge, that is, the image in which the sum of the edge components is small (see FIG. 6(b)), the enhancement degree of the edge components is set large and the edge components that are greatly enhanced are added to the input image. Therefore, after performing the adjustment of enhancing the edge, an output image in which the edge is clear to the same extent can be obtained even if the original image is an image with a clear edge or an image with an unclear edge. The control circuit 11 determines whether to set the enhancement degree large or small based on the sum of the edge components and the average luminance, but this is so that when the input image has the same color tone as a whole such as an entirely dark image, the edge components tend to become small, and the edge components of such image needs to be prevented from being enhanced in excess.

In the above description, processes such as the calculation of the average luminance by the average luminance calculating unit 22, the noise removal by the noise removing filter 21, the extraction of the edge components by the edge component extracting unit 23, the calculation of the sum of the edge components by the sum calculating unit 27, and the adjustment of enhancing the edge of the input image by the adjustment unit 29 are sequentially performed in units of pixels of the input image, but actually, each process is performed in a pipeline manner for every pixel of the input image due to limitation of the hardware source, higher speed of the processing, and the like. Therefore, since the information for all pixels are required in the average luminance calculating unit 22 and the sum calculating unit 27, the enhancement degree provided from the control circuit 11 to the enhancement degree adjustment unit 28 is based on the average luminance and the sum of the edge components calculated for the image of one frame before of the moving images.

Normally, when displaying moving images of a television program and the like, problems do not arise even if the edge of the input image is enhanced based on the average luminance and the sum of the edge components calculated for the image of one frame before since a plurality of images configuring the moving image do not have a great change in the brightness of the image or the sharpness of the edge, and the like between one frame before and after. However, great change may occur in the brightness of the image or the sharpness of the edge in the images between frames corresponding to the switching portion of the scenes in the moving image.

Therefore, in order to respond to such case, a detection means (not shown) for detecting the switching portion of the scene is mounted on the display apparatus 1, so that the edge of the input image is enhanced at the predefined enhancement degree instead of determining the enhancement degree based on the average luminance and the sum of the edge components calculated for the image of one frame before when the switching portion of the scene is detected by the detection means, thereby preventing from occurring great change in the sharpness of the edge at the switching portion of the scene. The switching portion of the scene can be detected, for example, by detecting change in the luminance value of each pixel or the characteristic value of the image such as color component for the image of the next frame of the image processed in the edge adjustment circuit 20.

It should be recognized that if there is extra hardware source, processing speed, or the like, the adjustment of enhancing the edge may be carried out in the adjustment unit 29 after calculating the average luminance and the sum of the edge components of the input image and determining the enhancement degree. In this case, the switching portion of the scene does not need to be detected.

Figure 7:
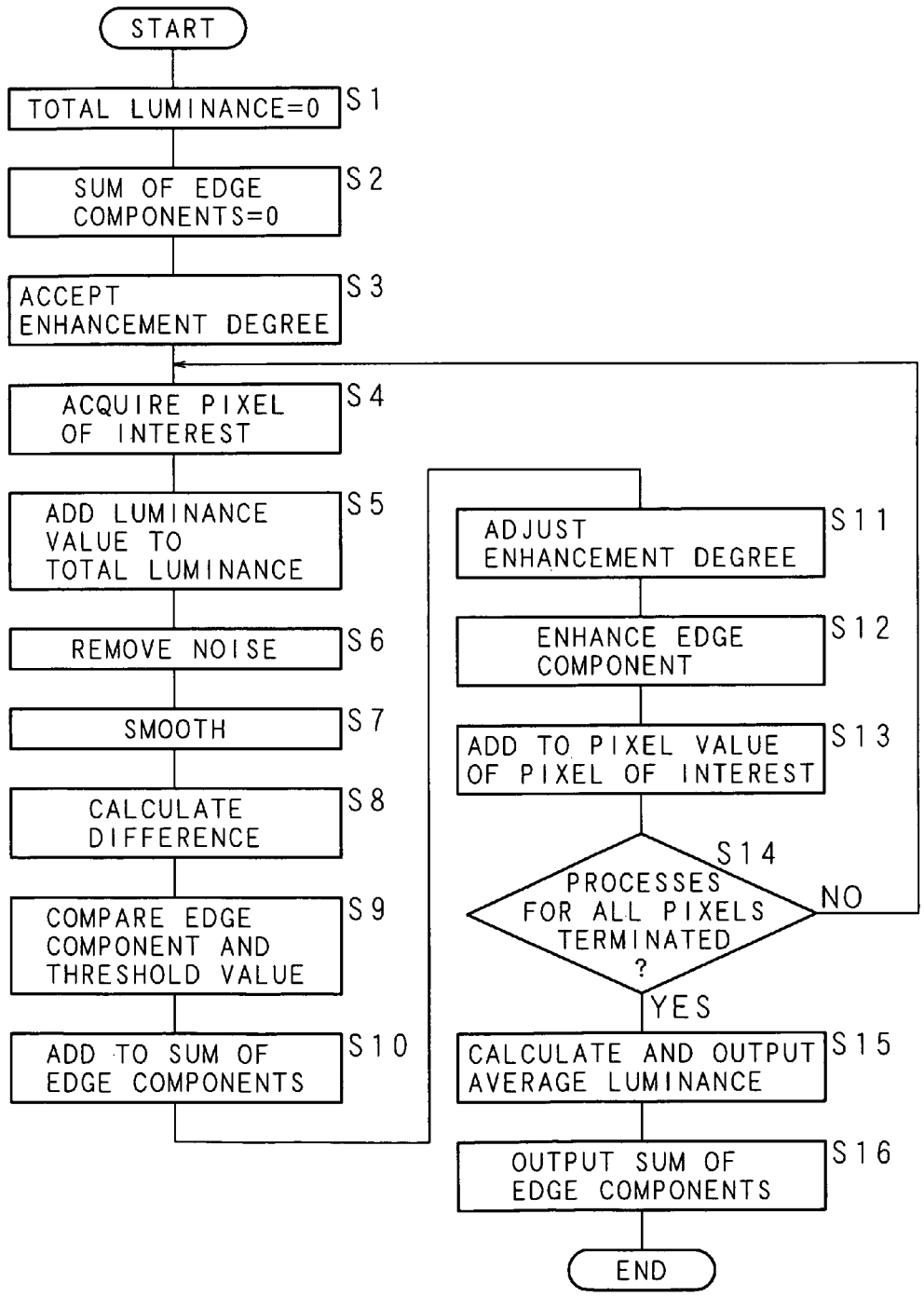
FIG. 7 is a flowchart showing the procedures of the edge adjusting process performed by an edge adjustment circuit of the display apparatus according to the present invention.

FIG. 7 is a flowchart showing the procedures of the edge adjusting process performed by the edge adjustment circuit 20 of the display apparatus 1 according to the present invention. The process for one input image is illustrated in FIG. 7, but the edge adjustment circuit 20 repeatedly performs the illustrated process for every plural image configuring the moving image. The edge adjustment circuit 20 first initializes the value of the total luminance, which is the variable for the average luminance calculating unit 22 to calculate the average luminance, to zero (step S1), initializes the value of the sum of the edge components calculated by the sum calculating unit 27 to zero (step S2), and accepts the enhancement degree determined by the control circuit 11 based on the average luminance and the sum of the edge components of the image one frame before (step S3).

One pixel is then acquired from the input image as pixel of interest (step S4), and the luminance value of the acquired pixel of interest is added to the total luminance (step S5). The noise removing filter 21 then removes noise by subtracting a predetermined value from the pixel value of the pixel of interest (step S6). The average of the pixel value of the pixel of interest removed with noise and the pixel value of the pixel adjacent to the pixel of interest is calculated in the smoothed image generating portion 24 to smooth the pixel of interest (step S7), and the difference between the pixel value of the smoothed pixel of interest and the pixel value of the pixel of interest before being smoothed is calculated (step S8) and such difference is extracted as the edge component.

The extracted edge component and the threshold value provided from the control circuit 11 are compared in the edge component comparing unit 26 (step S9), and the edge component greater than the threshold value is added to the sum of the edge components in the sum calculating unit 27 (step S10). The enhancement degree adjustment unit 28 adjusts the enhancement degree on the basis of the table shown in FIG. 5(*b*) based on the enhancement degree from the control circuit 11 accepted in step S3 and the edge component extracted from the pixel of interest (step S11), the edge component enhancement portion 30 multiplies the adjusted enhancement degree and the edge component to enhance the edge component (step S12), and the enhanced edge component is added to the pixel value of the pixel of interest acquired in step S4 (step S13) to perform the adjustment of enhancing the edge of the input image.

After the processes of steps S4 to S13 are terminated for one pixel of the input image, whether or not the processes are terminated for all the pixels of the input image is determined (step S14), wherein the process returns to step S4 if the processes are not terminated for all the pixels (S14: NO), and an unprocessed pixel is acquired from the input image as pixel of interest, and the above-described processes are repeatedly performed. If the processes are terminated for all pixels (S14: YES), the total luminance added in step S5 is divided by the number of pixels of the input image to calculate the average luminance, which is then output to the control circuit 11 (step S15), and the sum of the edge components added in step S10 is output to the control circuit 11 (step S16), and thereafter, the process is terminated.

The control circuit 11 acquires the average luminance output by the average luminance calculating unit 22 in step S15, and acquires the sum of the edge components output by the sum calculating unit 27 in step S16 to determine the enhancement degree when enhancing the edge of the image of the next frame from the table shown in FIG. 5(*a*), and provides the determined enhancement degree to the enhancement degree adjustment unit 28.

Figure 6:
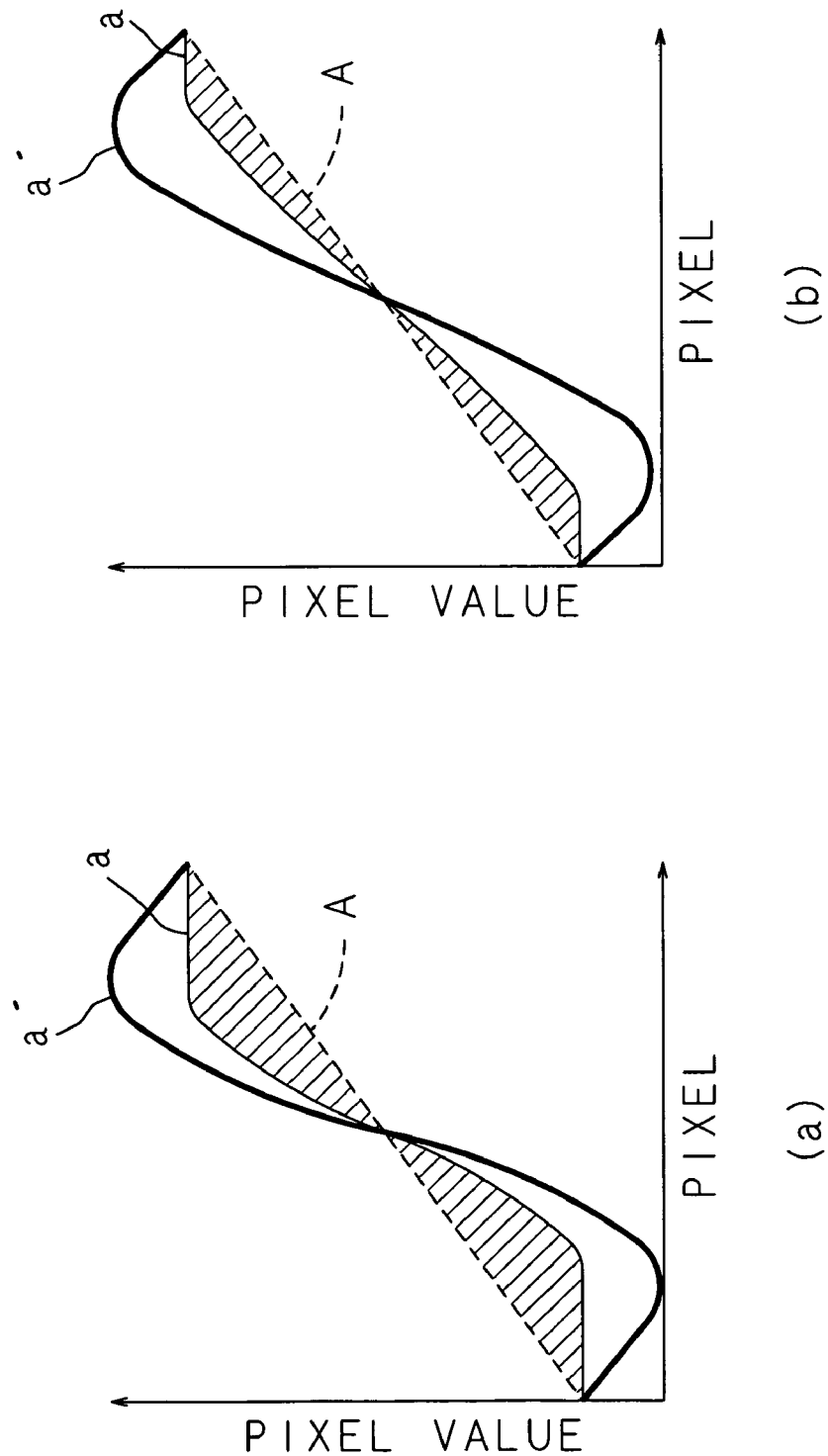
FIGS. 6(a) to 6(b) are schematic views showing one example of an adjustment of enhancing the edge performed by an adjustment unit.

In the display apparatus 1 of the above configuration, the edge components are extracted from the input image in the edge component extracting unit 23, the sum of the edge components is calculated in the sum calculating unit 27, and the enhancement degree of the edge components is determined in the control circuit 11 according to the sum of the edge components, so that images in which the edge is clear to the same extent can be displayed on the liquid crystal panel 4 as shown in FIGS. 6(*a*) and 6(*b*) even if the input image is an image of different characteristics such as HD image or up converted image. Furthermore, the average luminance of the input image is calculated in the average luminance calculating unit 22, and the enhancement degree of the edge components is determined according to the sum of the edge components and the average luminance, whereby although the edge components may be small if the input image has the same color tone as a whole such as an entirely dark image, the edge components of such image can be prevented from being enhanced in excess.

When extracting the edge components of the input image in the edge component extracting unit 23, the difference between the smoothed image, obtained by smoothing the input image, and the input image is calculated by the subtractor 25, and such difference is assumed as the edge components, so that the smoothing of the input image can be carried out only with addition and division as shown in equation (1), and thus the extraction of the edge components can be carried out through a simple calculation of addition, division, and subtraction. When performing the adjustment of enhancing the edge of the input image in the adjustment unit 29, the edge components enhanced in the edge component enhancement portion 30 is added to the input image in the adder 31, so that the adjustment of the edge of the input image can be carried out through a simple calculation of multiplication and addition.

The edge adjustment circuit 20 includes the noise removing filter 21 for removing the low-tone noise contained in the input image, so that an image of higher quality can be displayed on the liquid crystal panel 4. The edge components extracted in the edge component extracting unit 23 is compared with the threshold value in the edge component comparing unit 26, and the sum is calculated by adding only the edge components larger than the threshold value, so that the edge components mistakenly extracted due to influence of noise and the like is prevented from being added to the sum. The enhancement degree is adjusted according to the value of the edge components to be enhanced by the edge component enhancement portion 30 and not only the enhancement degree provided from the control circuit 11 in the enhancement degree adjustment unit 28, and thus the edge can be adjusted at the enhancement degree more suited to the characteristics of the input image.

In the present embodiment, description has been made using a liquid crystal display apparatus including the liquid crystal panel 4 as the display apparatus 1 by way of example, but is not limited thereto, and similar configuration can be applied to other display apparatuses such as a plasma display. The display apparatus 1 includes the input terminal portion 6 and the tuner 7 in the image input section 5 for providing the image to the image processing section 10, but is not limited thereto, and only one of which may be arranged, or the input image may be acquired through other methods. The tuner 7 is described as a tuner for receiving digital terrestrial broadcast, but is not limited thereto, and may be a tuner for receiving digital satellite broadcast, analog terrestrial broadcast, or the like.

The edge adjustment circuit 20 includes the noise removing filter 21 for removing the low-tone noise of the input image, but is not limited thereto, and may not include the noise removing filter 21. The edge components extracted in the edge component extracting unit 23 are compared with the threshold value in the edge component comparing unit 26, and only the edge components greater than the threshold value are added in the sum calculating unit 27, but it is not limited thereto, and the edge adjustment circuit 20 may not include the edge component comparing unit 26 and all the edge components extracted by the edge component extracting unit 23 may be added.

As shown in FIG. 5(*a*), the control circuit 11 determines the enhancement degree as either or of α or α' based on the average luminance and the sum of the edge components, but it is not limited thereto, and may determine the enhancement degree from three stages or may determine from greater number of stages. Furthermore, as shown in FIG. 5(*b*), the enhancement degree adjustment unit 28 adjusts to the enhancement degree of 16 stages according to the value of the edge components, but is not limited thereto, and may adjust to the enhancement degree of smaller than or equal to 15 stages or greater than or equal to 17 stages; and furthermore, the enhancement degree may not be adjusted according to the value of the edge components, and the edge may be adjusted based only on the enhancement degree provided from the control circuit 11.

Second Embodiment

Figure 8:
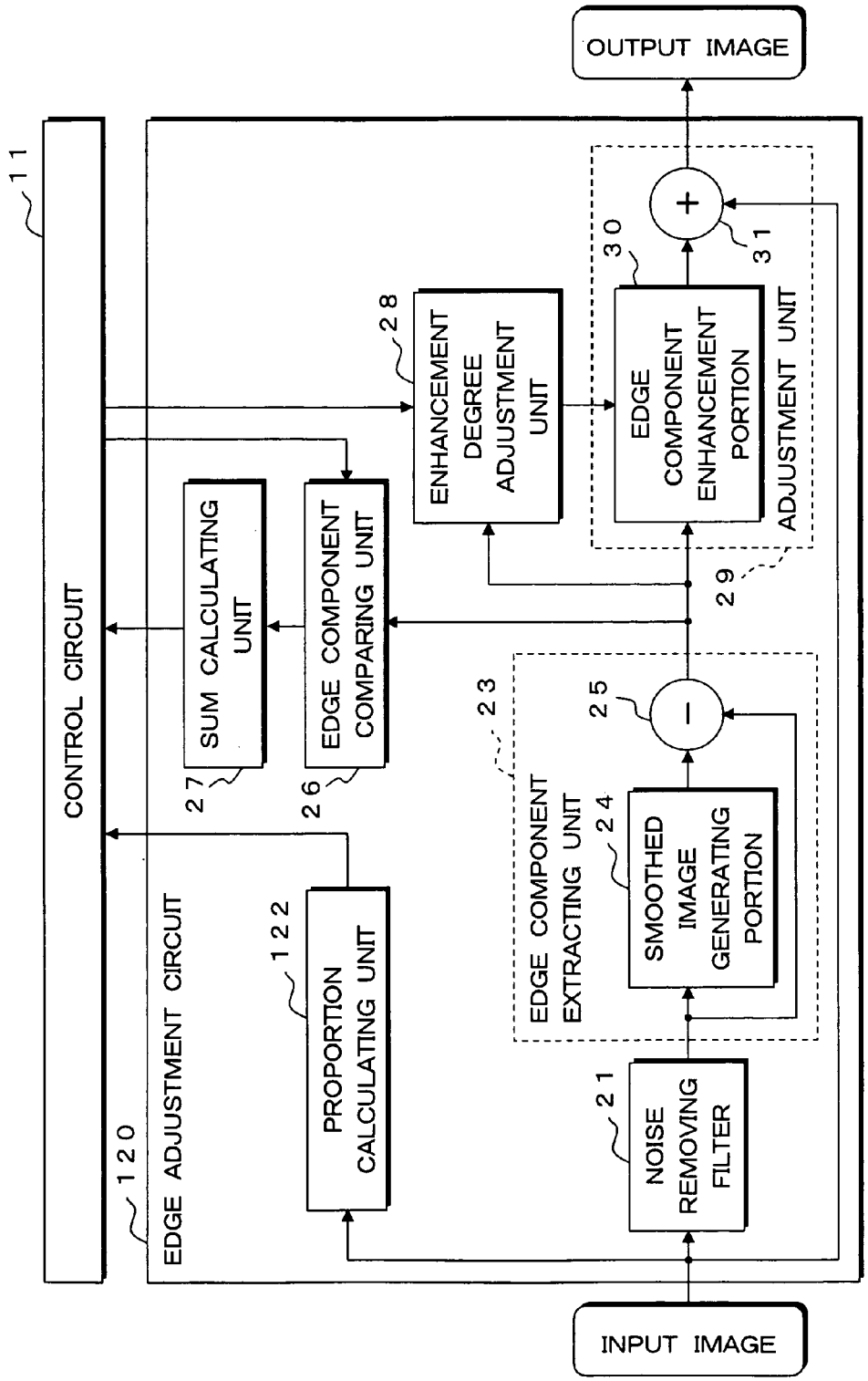
FIG. 8 is a block diagram showing a configuration of an edge adjustment circuit of a display apparatus according to a second embodiment of the present invention.

FIG. 8 is a block diagram showing a configuration of an edge adjustment circuit 120 of a display apparatus according to a second embodiment of the present invention. The edge adjustment circuit 20 of the first embodiment includes the average luminance calculating unit 22 for calculating the average luminance of the input image, but the edge adjustment circuit 120 of the second embodiment includes a proportion calculating unit 122 for calculating the proportion of the pixel which luminance value is greater than or equal to a predetermined luminance in the input image in place of the average luminance calculating unit 22. The proportion calculating unit 122 compares the luminance value of each pixel of the input image with a predefined threshold value, and counts the number of pixels of the pixels that luminance value is greater than the threshold value. The proportion can be calculated by performing the comparison with the threshold value for all the pixels of the input image, and dividing the number of counted pixels by the number of all pixels. The proportion calculating unit 122 provides the calculated proportion to the control circuit 11.

FIG. 9 is a schematic view describing the method for determining the enhancement degree of the edge components in the second embodiment, and a table corresponding to the table of FIG. 5(*a*) in the first embodiment is shown. The control circuit 11 determines the enhancement degree based on the proportion calculated by the proportion calculating unit 122, and the sum of the edge components of the input image calculated by the sum calculating unit 27, and provides the result to the enhancement degree adjustment unit 28. In this case, the control circuit 11 compares the proportion calculated by the proportion calculating unit 122 and a predefined threshold value (80% in the illustrated example), and also compares the sum of the edge components of the input image and a predefined threshold value TB, and determines the enhancement degree as a large value α' if the proportion is greater than or equal to 80% and the sum of the edge components is smaller than or equal to the threshold value TB, and determines the enhancement degree as a small value α in other cases. The control circuit 11 provides the determined enhancement degree α or α' (wherein, α<α') to the enhancement degree adjustment unit 28.

According to the above configuration, the enhancement degree adjustment unit 28 can adjust the enhancement degree by the table of FIG. 5(*b*), similar to the first embodiment. The effects similar to the display apparatus according to the first embodiment can be obtained by mounting the edge adjustment circuit 120 of the second embodiment on the display apparatus. In FIG. 9, the threshold value for comparing the proportion calculated by the proportion calculating unit 122 is 80%, but this is merely an example and it is not limited to such value.

Other configurations of the display apparatus according to the second embodiment are similar to the configurations of the display apparatus according to the first embodiment, and thus the same reference numerals are denoted for the corresponding elements, and the detailed description will be omitted.

Third Embodiment

Figure 10:
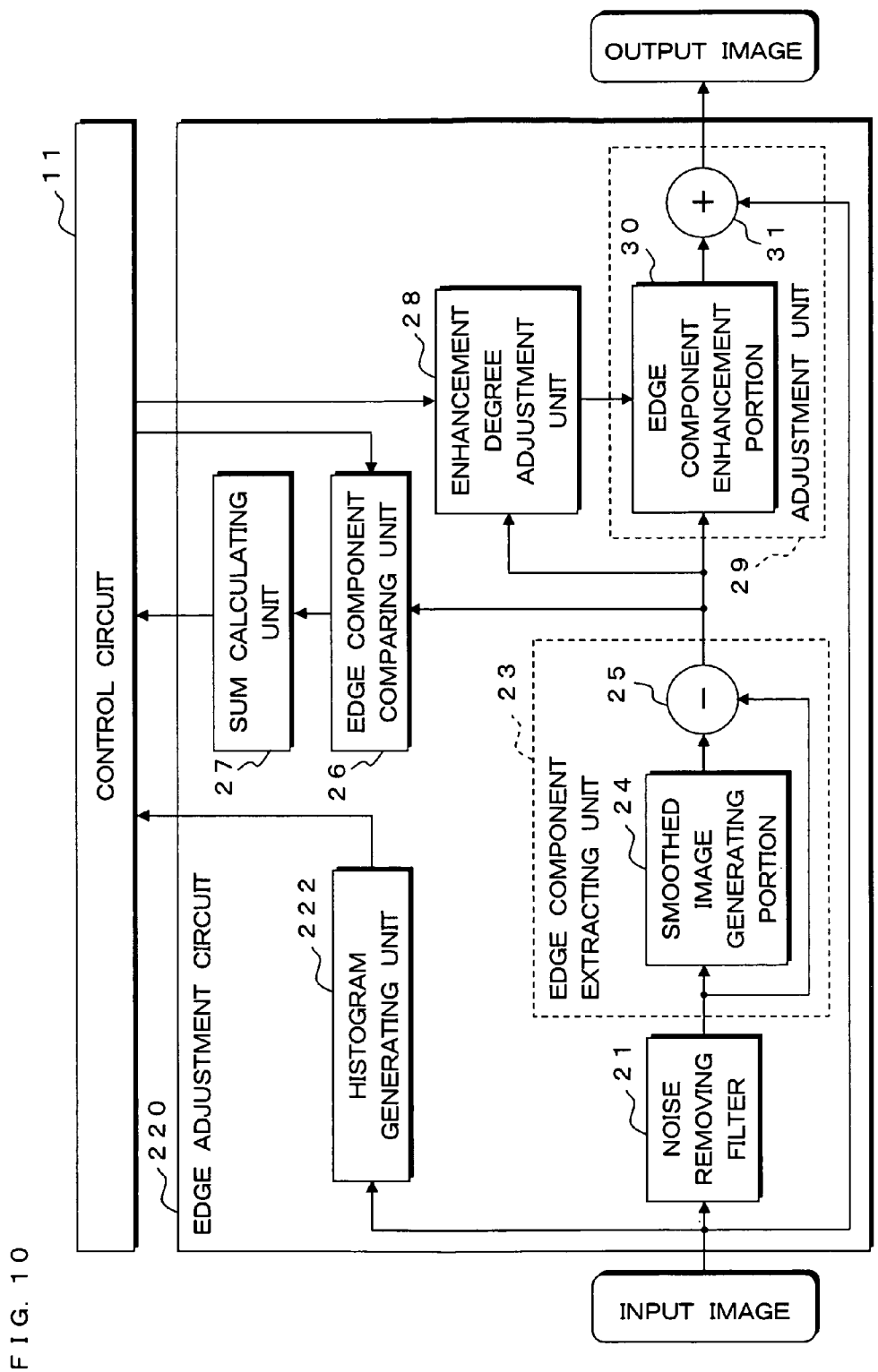
FIG. 10 is a block diagram showing a configuration of an edge adjustment circuit of a display apparatus according to a third embodiment of the present invention.

FIG. 10 is a block diagram showing a configuration of an edge adjustment circuit 220 of a display apparatus according to a third embodiment of the present invention. The edge adjustment circuit 20 of the first embodiment includes the average luminance calculating unit 22 for calculating the average luminance of the input image, but the edge adjustment circuit 220 of the third embodiment includes a histogram generating unit 222 for generating a histogram showing the distribution of the luminance values in the input image in place of the average luminance calculating unit 22. The histogram generating unit 222 acquires the luminance value of each pixel of the input image, generates a histogram by tabulating the number of pixels for every luminance value, and provides the same to the control circuit 11.

Figure 11:
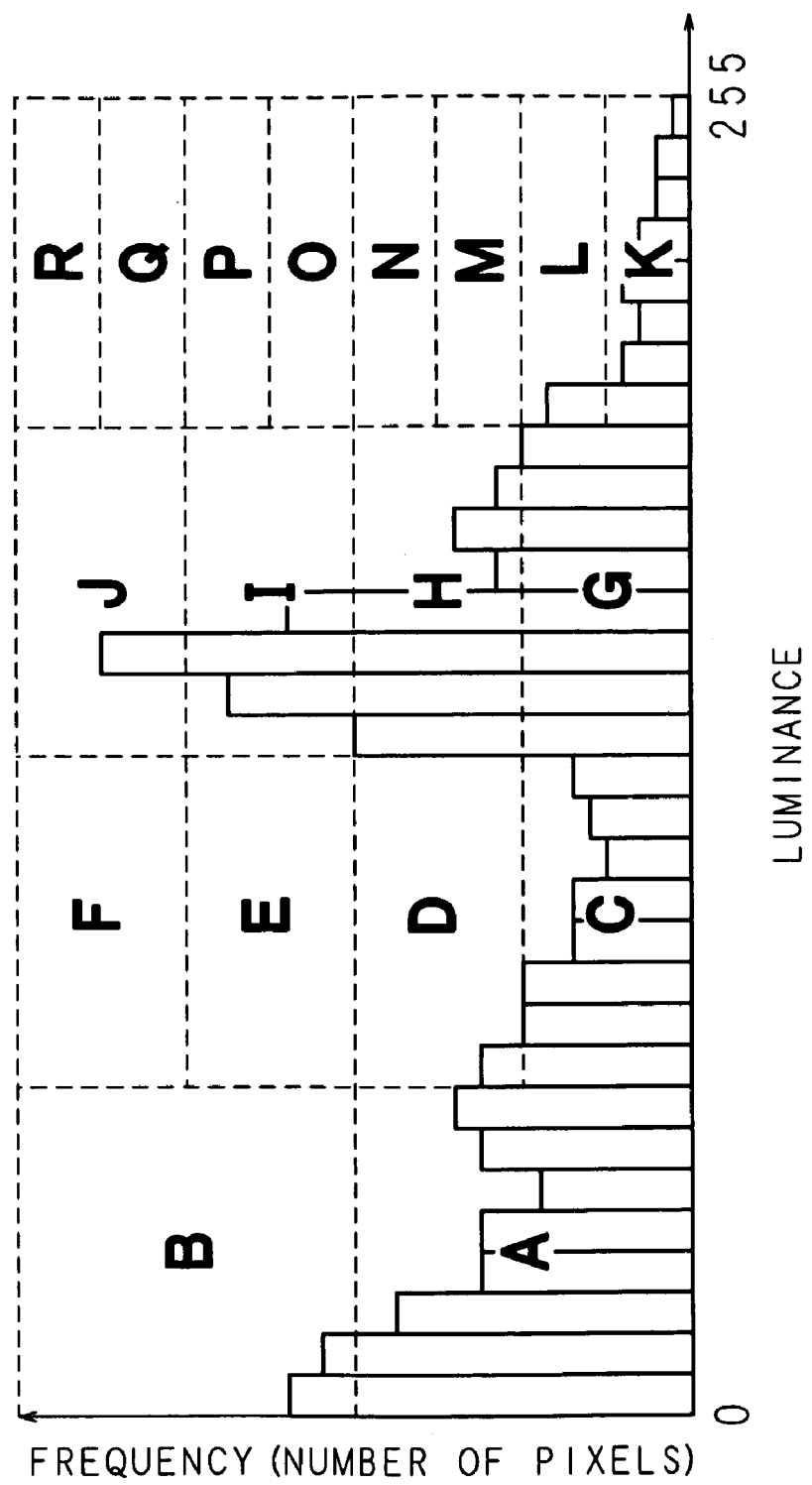
FIG. 11 is a schematic view showing one example of a histogram generated by a histogram generating unit.

FIG. 11 is a schematic view showing one example of a histogram generated by the histogram generating unit 222. In the illustrated example, the number of pixels in the input image is tabulated for every luminance value of eight stages, such as 0 to 7, 8 to 15, 16 to 23, when the luminance value of each pixel of the input image is expressed in the range of 0 to 255, that is, with a value of eight bits, and the frequency distribution of the luminance value of the input image is generated. The histogram generating unit 222 creates such histogram for every input image, and provides the same to the control circuit 11.

The control circuit 11 determines the enhancement degree of the edge of the input image based on the histogram provided from the histogram generating unit 222. The control circuit 11 provides a determination region as shown with a broken line in FIG. 11 with respect to the provided histogram, and determines the enhancement degree by examining whether or not the distribution of frequency exists within such determination region. In FIG. 11, determination regions A and B for determining the distribution of frequency in two stages are provided with respect to the range of luminance 0 to 63, determination regions C to F for determining the distribution of frequency in four stages are provided with respect to the range of luminance 64 to 127, determination regions G to J for determining the distribution of frequency in four stages are provided with respect to the range of luminance 128 to 191, and determination regions K to R for determining the distribution of frequency in eight stages are provided with respect to the range of luminance 192 to 255.

The enhancement degrees $\alpha_A$ to $\alpha_R$ are corresponded to each determination region A to R, and the control circuit 11 may, for example, examine whether or not the distribution of frequency exists within the determination regions of the determination region R to A (reverse order of the alphabet), and acquire the enhancement degrees $\alpha_A$ to $\alpha_R$ corresponded to the determination region in which the distribution of frequency existed first as the first enhancement degree. The control circuit 11 then adjusts the first enhancement degrees $\alpha_A$ to $\alpha_R$ based on the sum provided from the sum calculating unit 27 to obtain a second enhancement degree $\alpha'_A$ to $\alpha'_R$, and provides the same to the enhancement degree adjustment unit 28 as the determined enhancement degree. The enhancement degree adjustment unit 28 adjusts the enhancement degrees $\alpha'_A$ to $\alpha'_R$ provided from the control circuit 11 according to the value of the edge components to be enhanced by the edge component enhancement portion 30, and provides the same to the edge component enhancement portion 30. The details of the adjustment process performed by the enhancement degree adjustment unit 28 will be omitted, but the adjustment process can be carried out using a table similar to the table shown in FIG. 5(b) (larger table corresponding to enhancement degrees $\alpha'_A$ to $\alpha'_R$).

Therefore, the enhancement degree more suited to the input image can be determined by providing the histogram generating unit 222 in the edge adjustment circuit 220 to generate the histogram, and determining the enhancement degree corresponding to the histogram in the control circuit 11. The manner of providing the determination region shown in FIG. 11, the method for determining the first enhancement degree from such determination region, and the like are merely examples, and are not limited thereto.

Other configurations of the display apparatus according to the third embodiment are similar to the configurations of the display apparatus according to the first embodiment, and thus the same reference numerals are denoted for the corresponding elements, and the detailed description will be omitted.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. An edge adjustment method for adjusting an edge of an input image using an image processing device, comprising the steps of:
   extracting edge components of the input image by the image processing device;
   calculating a sum of the extracted edge components by the image processing device;
   calculating an average of luminance components of the input image by the image processing device;
   determining, by the image processing device, an enhancement degree of the edge as a large value if the sum of the edge components is smaller than or equal to a threshold value and the average luminance is greater than or equal to a threshold value, and as a small value if the sum of the edge components is greater than the threshold value or the average luminance is smaller than the threshold value;
   adjusting the determined enhancement degree according to the extracted edge components by the image processing device;
   enhancing, according to the adjusted each enhancement degree, the each edge component corresponding to the each enhancement degree by the image processing device; and
   adjusting the edge of the input image according to the enhanced edge components by the image processing device.

2. The edge adjustment method according to claim 1, wherein when extracting the edge components of the input image,
   a smoothed image, obtained by smoothing the input image, is generated;
   a difference of the input image and the smoothed image is calculated; and
   the calculated difference is extracted as the edge components.

3. The edge adjustment method according to claim 1, comprising the steps of:
   adjusting the edge by adding the enhanced edge components to the input image by the image processing device.

4. An image processing device for performing a process of adjusting an edge of an input image, comprising:
   an extracting unit for extracting edge components of the input image;
   a sum calculating unit for calculating a sum of the edge components extracted by the extracting unit;
   an average luminance calculating unit for calculating an average of luminance components of the input image;
   a determination unit for determining an enhancement degree of the edge as a large value if the sum of the edge components is smaller than or equal to a threshold value and the average luminance is greater than or equal to a threshold value, and as a small value if the sum of the edge components is greater than the threshold value or the average luminance is smaller than the threshold value;

an adjusting unit for adjusting the determined enhancement degree according to the extracted edge components;

an adjusting unit for enhancing, according to the adjusted each enhancement degree, the each edge component corresponding to the each enhancement degree, and adjusting the edge of the input image according to the enhanced edge components.

5. The image processing device according to claim 4, wherein the extracting unit includes:

a generating unit for generating a smoothed image, obtained by smoothing the input image; and a difference calculating unit for calculating a difference of the input image and the smoothed image, and extracts the difference calculated by the difference calculating unit as the edge components.

6. The image processing device according to claim 4, wherein the adjusting unit adjusts the edge by adding the enhanced edge components to the input image.

7. A display apparatus comprising:

the image processing device according to claim 4;

an input unit for acquiring and inputting an image to the image processing device; and a display unit for displaying an image performed with the adjustment of the edge by the image processing device.

* * * * *